Dec. 14, 1965  C. F. LUCK, JR., ETAL  3,223,944
LASER EMPLOYING ELLIPTICAL REFLECTOR CAVITY
Original Filed Nov. 29, 1961

INVENTORS
CLARENCE F. LUCK, JR.
MAXWELL R. KRASNO
MIKAEL CIFTAN

BY
AGENT 3,223,944
LASER EMPLOYING ELLIPTICAL
REFLECTOR CAVITY
Clarence F. Luck, Jr., Waltham, Mass., Maxwell R. Krasno, Santa Barbara, Calif., and Mikael Ciftan, Wayland, Mass., assignors to Raytheon Company, Lexington, Mass., a corporation of Delaware
Continuation of application Ser. No. 155,651, Nov. 29, 1961. This application June 25, 1964, Ser. No. 383,538
1 Claim. (Cl. 331—94.5)

This is a continuation of our abandoned application Serial No. 155,651, filed November 29, 1961.

This invention relates to devices for producing electromagnetic radiation and has particular reference to improved means in optical masers for directing large quantities of activating input radiation from a selected source onto a medium which is utilized to produce coherent stimulated output radiation.

In known types of optical masers wherein the input radiation is in the form of visible light, ultraviolet or infrared radiation, a reflector cavity is provided for reflecting such input power from the source toward the coherent radiation-producing medium. Known types of maser structures embody a ruby rod, for example, as a source of coherent radiation which is located in the center of a helical flash tube used as the input radiation source. In such structures, a considerable amount of power was required to operate the device, the input energy required per flash at room temperature being from 2000-3000 joules. Such energy ranges necessitated the use of relatively large heavy power supplies.

We have found that extremely low efficiency results from loss of energy emanating from the flash tube due to the fact that most of the radiation from the flash tube is not intercepted by the ruby and, instead, is reabsorbed by the flash tube structure or simply radiated outwardly away from the ruby.

Therefore, in accordance with this invention, we have provided a device wherein substantially all of the radiation emanating from the flash tube source is concentrated in the ruby. This is accomplished by providing a source of input radiation which is located in spaced relation with the output radiation member, both of which are enclosed within a cavity of predetermined design selected for reflecting nearly all of the illumination from the flash tube onto the output medium.

We have found that if instead of mounting the output source within an encircling input source, the two sources are spaced apart within a reflecting cavity, great improvements are achieved in the quantity of illumination which actually impinges upon the output source. For example, if a cylindrical cavity contains the two sources in parallel spaced apart relation adjacent the axis of the cylinder, the greater part of the illumination from the input source will reach the output radiation member.

Even greater improvement results when the cavity has an elliptic configuration and the two sources are located at the two foci of the ellipse. A device of the most efficient construction embodies an elliptic cylinder having the optically active output radiation element along one focal line and the activating input radiation source along the second focal line. This elliptic cylindrical shape is utilized when the input and output radiation sources are line sources. When such sources are point sources, the cavity should be an ellipsoid of revolution with the two sources located at the first and second foci. In such elliptic cavities having the two sources located at the foci thereof, all the illumination from the activating source falls upon the output radiation member except the very small portion which falls behind the lamp in the direction away from the member. This small "shadow" portion falls back upon the lamp which comprises the activating source and is reabsorbed to some degree by the lamp.

Accordingly, a primary object of this invention is to provide an improved device for producing electromagnetic radiation.

Another primary object is to provide a device of the above character which utilizes substantially all of the illumination from an input radiation source.

A further object is to provide a device of the above character which is self-contained, light weight, and relatively simple in design and operation.

Other objects and advantages of this invention will become apparent from the following description taken in connection with the accompanying drawings, wherein.

A device for producing electromagnetic radiation requires that if that output frequency is in the visible region, such as is the case in ruby optical masers, the input power must be used very efficiently because of the limitation of available sources of input power. This invention is concerned with a structure which is highly efficient when infrared, visible or ultraviolet input power sources or combinations thereof are used.

Optical masers require input power in the form of electromagnetic wave energy or radiation whose frequency may range from far ultraviolet to the far infrared. Furthermore, all masers have a resonant structure within those boundaries coherent stimulated radiation is produced. The medium which produces this coherent radiation can be solid, liquid, or gaseous, and may have a variety of configurations. Furthermore, frequency of the output energy or radiation can be anywhere from the ultraviolet to and including the microwave region.

No matter what other conditions exists, we have found that if the input radiation is in the form of visible light, ultraviolet or infrared radiation or combinations thereof, best results are obtained when using a reflector cavity which concentrates all of the input power into the medium which is used to produce the output radiation. Accordingly, for a point-like input radiation source and a point-like medium which produces output radiation, we make use of an ellipsoid of revolution with the source and medium in the first and second foci respectively. For a line source, however, an elliptic cylinder is used with a line-type medium of optically active material along one focal line and the input radiation source along the other.

Figure 1:
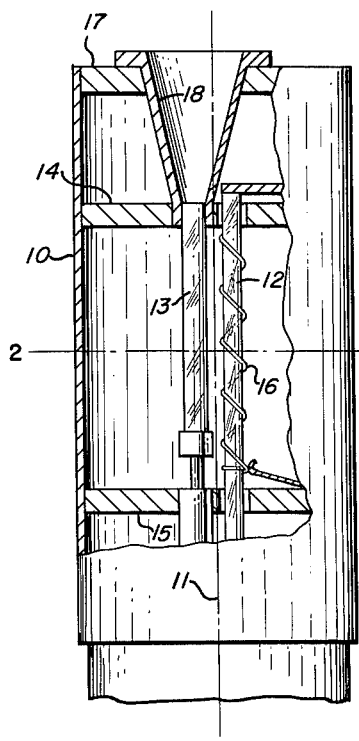
FIG. 1 is a fragmentary elevational view partly in axial section showing one embodiment of the invention.
Figure 2:
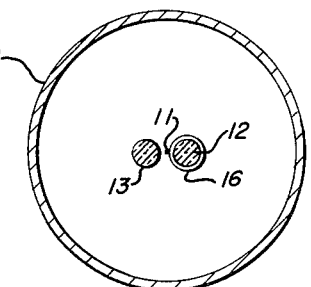
FIG. 2 is a sectional view taken substantially on line 2—2 of FIG. 1.

Although not quite as efficient as a true elliptic reflector system, extremely good results are obtained by providing a cylindrical cavity 10, as shown in FIGS. 1 and 2, having a central longitudinal axis 11. A line-like source 12 of input radiation and a line-like output radiation member 13 are located diametrically opposite one another on opposite sides of the axis 11 and are disposed substantially parallel with each other and with axis 11. This structure places the output member outside the structure of the input source, as opposed to known prior art structures wherein the input source is a helix having the output member located coaxially within the turns thereof.

In the presently described structure the output member and input source are located as close to the axis 11 as is feasible in an attempt to approach the optimum condition wherein both would lie on the axis whereby all input radiation will be reflected back to the axis by the reflecting inner surface of the cylindrical cavity 10. Since it is impossible to align both the input source and output radiation member on the axis, closely spaced relationship with the axis 11 is provided.

The cavity 10 may be any suitable material formed into a hollow cylindrical shape and having disc-like end plates 14 and 15 substantially closing the interior compartment formed thereby. The inner surfaces of the side and end walls are preferably all made to be highly reflective such as by polishing or by deposition of mirror-like finishes thereon, or both.

The input source 12 is indicated as a flash tube which may be of conventional or nonconventional design and is mounted in the structure in any suitable manner whereby substantially parallel relationship with axis 11 and output member 13 are maintained. The ends of the flash tube 12 are suitably connected into circuitry (not shown) whereby the tube may be flashed to emit a bright burst of illumination for a selected relatively short period of time in the known manner of flash tubes of this type. The helical wire 16, wound in widely spaced coils about the flash tube 12, comprises a trigger for initiating the firing of the tube.

The output radiation member 13 is shown as a ruby rod but may comprise any other suitable optically active material capable of producing the desired radiation, coherent being desired in optical masers of the character described, and of being physically shaped into rod-like configurations. Rod 13 is mounted in any suitable manner substantially parallel with axis 11 and with the axis of tube 12, and is shown with its ends supported by end walls 14 and 15. However, the end which is in end wall 14 is exposed so that illumination therefrom may be directed exteriorly of the device. An end cap structure 17 carrying a conical port 18 may or may not be used, as desired. The ends of rod 13 may be suitably coated to increase light transmission from the rod in the desired manner.

In accordance with this invention, when the flash tube 12 is operated, the resultant radiation, termed herein as input illumination, is emitted in all directions. It is obvious that some of this input illumination falls directly upon the rod 13. However, all of the illumination which does not pass directly to the rod is directed upon the reflecting surfaces of the cavity and is reflected back into the general area of the axis 11 where it falls upon the tube 12 or rod 13 or passes through to an opposite wall where it is again reflected back in the general direction of the central area of the device. It is to be noted that the end walls, being highly reflective, aid considerably in reflecting illumination from the source toward the rod.

We have found that the energy required to operate this device is extremely low, in the order of less than 100 joules at room temperature, as opposed to about 2000–3000 joules which is required to operate prior art types of optical masers. This permits the use of small power supplies.

The considerable improvement which results from the presently described structure is attributed to the fact that most of the input illumination emanating from the flash tube is concentrated in the ruby rod, whereas in prior art devices most of the input illumination is not intercepted by the ruby but is either radiated away or reabsorbed.

Figure 3:
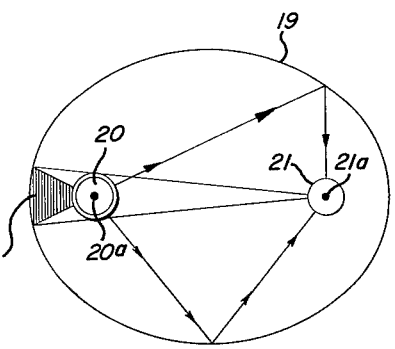
FIGS. 3 and 4 are diagrammatic views of modified devices embodying the invention.

FIG. 3 diagrammatically illustrates a further improvement wherein reflecting cavity 19 has an elliptic shape, specifically a cylindrical ellipse, and contains an input source 20 of activating radiation and an output radiation member 21 both of which are line-like (as opposed to point-like) and are located on the two focal lines 20a and 21a respectively of the ellipse formed by the inner surfaces of the cavity. Here again the input source 20 may be a flash tube and the output member 21 a ruby rod or the like. All of the radiation or illumination originating from source 20 is focused onto the member 21, as shown by ray lines and arrows, except for the small portion 22 of illumination which falls behind the source 20 away from member 21. However, this portion 22 which is lost is a very small fraction of the total radiation from source 20 and is minimized by proper design of the relative distances between the source and member and other pertinent parameters of the ellipse. This type of configuration is the most efficient in the consideration of reducing the input threshold energy. Optimum efficiency will be realized when the flash tube and rod are of the same size and shape.

Figure 4:
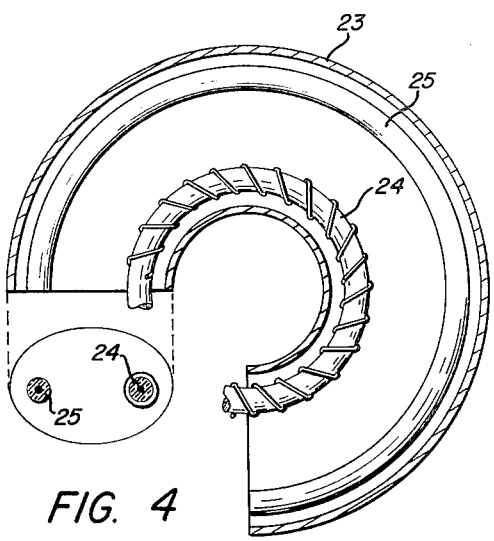

Another structure embodying elliptical reflector cavity configuration is shown diagrammatically in FIG. 4 wherein the cavity 23 comprises three quadrants of an annulus whose cross section is an ellipse. The input energy source 24 and output radiation member 25, which again may be any suitable devices such as a flash tube and a ruby rod respectively, are located along the two circular foci of the elliptical doughnut 23. In a structure of this configuration, the principles and functions of the various elements are similar to those set forth in the description of the device of FIG. 3 whereby more efficient utilization is made of the radiation from the input source, with relatively little power being required to operate the device.

A device embodying the present invention has other advantages such as permitting simple and diversified methods for cooling the flash tubes or ruby rod, or both, by permitting use of selective reflecting characteristics in the coatings on the walls of the cavity whereby only desired frequencies may be reflected while undesired frequencies may be transmitted externally if desired, by permitting introduction internally of other elements such as filters to selectively control desired radiations, or by permitting cryostated mounting of the coherent radiation producing member in order to take advantage of certain crystals which may have desirable properties at lower temperatures.

From the foregoing it will be apparent that all of the objects and advantages of this invention have been accomplished by the provision of an optical maser device wherein extremely large amounts of radiation are made to pass onto the radiation producing member. It will be apparent, however, that many changes and modifications may be made in the structures shown and described without departing from the spirit of the invention as expressed in the accompanying claim. Therefore, the matter shown and described should be considered as illustrative and not in a limiting sense.

What is claimed is:

An optical maser for producing coherent electromagnetic energy, comprising a hollow cavity having the shape of a portion of an annulus and having an elliptical cross-sectional shape and further embodying two known spaced parallel focal lines of circular shape therewithin and extending longitudinally thereof, a line-like source of activating radiation of a known frequency located within the cavity along one focal line, and a line-like medium which produces coherent electromagnetic energy of a different frequency from said activating radiation when irradiated by said activating radiation located within the cavity along the other focal line, the relative size and spacing of said source with respect to said cavity being such that only a very small fraction of the total radiation from the source is intercepted by the source and all remaining radiation from the source is transmitted to said medium the interior surfaces of the cavity being highly reflective and the interior of the effective portion of the cavity being void of radiation-intercepting means whereby substantially all the radiation from the source will pass directly and by reflection from the source to the medium which produces coherent electromagnetic energy, and means for directing outwardly of said cavity substantially only said coherent electromagnetic energy.

References Cited by the Examiner

UNITED STATES PATENTS

| | | |
|---|---|---|
| 1,278,026 | 9/1918 | Salto. |
| 2,543,053 | 2/1951 | Parker. |
| 2,929,922 | 3/1960 | Schawlow et al. ____ 331—94.5 X |
| 2,943,174 | 6/1960 | Parker. |

FOREIGN PATENTS

| | | |
|---|---|---|
| 484,199 | 4/1938 | Great Britain. |
| 957,235 | 5/1964 | Great Britain. |
| 125,669 | 1/1960 | Russia. |

OTHER REFERENCES

Collins et al., "Coherence, Narrowing, Directionality and Relaxation Oscillations in the Light Emission From Ruby," Physical Review Letters, volume 5, No. 7, Oct. 1, 1960, page 303.

Columbia Radiation Laboratory, "Research Investigation Directed Toward Extending the Useful Range of the Electromagnetic Spectrum," Eighth Quarterly Progress Report, December 15, 1959, pages 14 and 15.

"Laser Technical Proposal, LTP-100," Raytheon Co., Waltham, Mass.

JEWELL H. PEDERSEN, *Primary Examiner.*